US007665870B2

(12) United States Patent  
Golle et al.

(10) Patent No.: US 7,665,870 B2
(45) Date of Patent: *Feb. 23, 2010

(54) SAFETY DEVICE FOR TRANSPORTING OVERSIZED LOADS

(75) Inventors: Aaron Golle, Shakopee, MN (US); John Golle, Eden Prairie, MN (US)

(73) Assignee: Safe Lites, LLC, Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/970,426

(22) Filed: Jan. 7, 2008

(65) Prior Publication Data

US 2008/0123356 A1    May 29, 2008

Related U.S. Application Data

(63) Continuation of application No. 11/552,864, filed on Oct. 25, 2006, now Pat. No. 7,316,491, which is a continuation of application No. 10/707,621, filed on Dec. 24, 2003, now Pat. No. 7,128,449, which is a continuation-in-part of application No. 10/645,873, filed on Aug. 21, 2003, now Pat. No. 7,306,345.

(60) Provisional application No. 60/429,671, filed on Nov. 27, 2002.

(51) Int. Cl.
*B60Q 1/00* (2006.01)
*B60Q 3/00* (2006.01)

(52) U.S. Cl. .................. 362/485; 362/84; 362/540; 40/544

(58) Field of Classification Search .................. 362/84, 362/485, 540; 40/544, 588–591
See application file for complete search history.

(56) References Cited

U.S. PATENT DOCUMENTS

| 2,721,808 | A | 10/1955 | Roberts et al. |
| 2,758,401 | A | 8/1956 | Wilson |
| 2,843,954 | A | 7/1958 | Rheeling |
| 2,844,388 | A | 7/1958 | Rheeling |
| 2,983,914 | A | 5/1961 | Fuller |
| 3,237,963 | A | 3/1966 | Menzer |
| 3,582,108 | A | 6/1971 | Carlton |

(Continued)

FOREIGN PATENT DOCUMENTS

DE    10108713    9/2002

(Continued)

OTHER PUBLICATIONS

"U.S. Appl. No. 10/645,873 Office Action mailed May 18, 2005", 15 pages.

(Continued)

*Primary Examiner*—Jason Moon Han
(74) *Attorney, Agent, or Firm*—Schwegman, Lundberg & Woessner P.A.

(57) ABSTRACT

One embodiment includes a method for improving driver safety in a highway vehicle that includes an oversized load that includes sizing at least one safety indicia illuminated by at least one EL lighting surface according to at least one government safety standard, affixing the at least one safety indicia to the front and to the rear of the highway vehicle and operating the vehicle on a highway.

18 Claims, 12 Drawing Sheets

U.S. PATENT DOCUMENTS

| | | | |
|---|---|---|---|
| 3,683,842 | A | 8/1972 | Logan |
| D235,633 | S | 7/1975 | Cooper |
| 3,975,849 | A | 8/1976 | Tuleja |
| 4,087,124 | A | 5/1978 | Wiley, Jr. |
| 4,297,675 | A | 10/1981 | Rubottom et al. |
| 4,494,326 | A | 1/1985 | Kanamori |
| 4,603,065 | A | 7/1986 | Mori et al. |
| 4,645,970 | A | 2/1987 | Murphy |
| 4,895,110 | A | 1/1990 | LoCascio |
| 4,927,177 | A | 5/1990 | Price |
| 5,005,306 | A | 4/1991 | Kinstler |
| 5,025,351 | A | 6/1991 | Martin |
| 5,337,224 | A | 8/1994 | Field et al. |
| 5,339,550 | A | 8/1994 | Hoffman |
| 5,367,806 | A | 11/1994 | Hoffman |
| 5,426,414 | A | 6/1995 | Flatin et al. |
| 5,428,512 | A * | 6/1995 | Mouzas ............ 362/466 |
| 5,434,013 | A | 7/1995 | Fernandez |
| 5,437,113 | A | 8/1995 | Jones |
| 5,444,930 | A | 8/1995 | Loew |
| 5,479,325 | A | 12/1995 | Chien |
| 5,485,355 | A | 1/1996 | Voskoboinik et al. |
| 5,497,304 | A | 3/1996 | Caine |
| 5,518,561 | A | 5/1996 | Rosa |
| 5,533,289 | A | 7/1996 | Hoffman |
| 5,566,384 | A | 10/1996 | Chien |
| 5,621,991 | A | 4/1997 | Gustafson |
| 5,666,269 | A | 9/1997 | Romero et al. |
| 5,692,327 | A | 12/1997 | Wynne et al. |
| 5,709,455 | A | 1/1998 | Danekas et al. |
| 5,775,016 | A | 7/1998 | Chien |
| 5,779,346 | A | 7/1998 | Burke |
| 5,909,960 | A | 6/1999 | Jager et al. |
| 6,037,865 | A | 3/2000 | Heinz et al. |
| 6,112,437 | A | 9/2000 | Lovitt |
| 6,164,804 | A | 12/2000 | Self |
| 6,195,925 | B1 | 3/2001 | Werner |
| 6,203,391 | B1 | 3/2001 | Murasko |
| 6,309,764 | B1 | 10/2001 | Burrows |
| 6,371,633 | B1 | 4/2002 | Davis |
| 6,409,367 | B1 | 6/2002 | Pratt |
| 6,446,879 | B1 | 9/2002 | Kime |
| 6,551,726 | B1 | 4/2003 | Burrows |
| 6,604,834 | B2 | 8/2003 | Kalana |
| 6,637,906 | B2 | 10/2003 | Knoerzer et al. |
| 6,751,898 | B2 | 6/2004 | Heropoulos et al. |
| 6,771,508 | B1 | 8/2004 | Ghosh |
| 6,778,077 | B1 | 8/2004 | DeGraaf |
| 6,840,098 | B2 | 1/2005 | Halliday |
| 6,874,904 | B2 | 4/2005 | Hsu |
| 7,128,449 | B2 | 10/2006 | Golle et al. |
| 7,306,345 | B2 | 12/2007 | Golle et al. |
| 7,316,491 | B2 | 1/2008 | Golle et al. |
| 7,478,935 | B2 | 1/2009 | Golle et al. |
| 2001/0024370 | A1 | 9/2001 | Macher et al. |
| 2002/0096102 | A1 | 7/2002 | Sloot |
| 2002/0181226 | A1 | 12/2002 | Saminski et al. |
| 2003/0231485 | A1 | 12/2003 | Chien |
| 2004/0128882 | A1 | 7/2004 | Glass |
| 2007/0002553 | A1 | 1/2007 | Golle et al. |
| 2007/0053172 | A1 | 3/2007 | Golle et al. |
| 2007/0245606 | A1 | 10/2007 | Golle et al. |

FOREIGN PATENT DOCUMENTS

| | | |
|---|---|---|
| GB | 2358913 | 8/2001 |
| WO | WO-9857097 A1 | 12/1998 |
| WO | WO-2004050426 A3 | 6/2004 |

OTHER PUBLICATIONS

"U.S. Appl. No. 10/645,873, Non Final Office Action mailed Nov. 25, 2005", 15 pages.

"U.S. Appl. No. 10/645,873 Non Final Office Action mailed Feb. 2, 2005", 7 pages.

"U.S. Appl. No. 10/645,873 Non Final Office Action mailed Aug. 9, 2006", 13 pages.

"U.S. Appl. No. 10/645,873 Notice of Allowance mailed Jul. 26, 2007", 8 pages.

"U.S. Appl. No. 10/645,873 Response filed Feb. 2, 2007 to Non Final Office Action mailed Aug. 9, 2006", 9 pages.

"U.S. Appl. No. 10/645,873 Response filed Apr. 15, 2005 to Non Final Office Action mailed Feb. 2, 2005", 11 pages.

"U.S. Appl. No. 10/645,873 Response filed May 25, 2006 to Non Final Office Action mailed Dec. 2, 2005", 9 pages.

"U.S. Appl. No. 10/645,873 Response filed Sep. 16, 2005 to Non Final Office Action mailed May 18, 2005", 8 pages.

"U.S. Appl. No. 10/645,873 Response to Notice of Non-Compliant Amendment Feb. 27, 2007", 6 pages.

"U.S. Appl. No. 10/707,617 Final Office Action mailed Jun. 6, 2006", 9 pages.

"U.S. Appl. No. 10/707,617 Non Final Office Action mailed Sep. 15, 2005", 11 pages.

"U.S. Appl. No. 10/707,617 Response filed Mar. 15, 2006 to Non Final Office Action mailed Sep. 15, 2005", 11 pages.

"U.S. Appl. No. 10/707,618 Appeal Brief mailed Dec. 31, 2007", 16 pages.

"U.S. Appl. No. 10/707,618 Examiner's Answer mailed Apr. 1, 2008 to Appeal Brief mailed Dec. 31, 2007", 9 pages.

"U.S. Appl. No. 10/707,618 Final Office Action Feb. 28, 2007", 8 pages.

"U.S. Appl. No. 10/707,618 Non-Final Office Action Sep. 14, 2005", 14 pages.

"U.S. Appl. No. 10/707,618 Response to Non-Final Office Action Feb. 16, 2006", 18 pages.

"U.S. Appl. No. 10/707,618 Response to Notice of Non-Compliant Amendment Mar. 20, 2006", 28 pages.

"U.S. Appl. No. 10/707,619 Final Office Action Jun. 8, 2006", 17 pages.

"U.S. Appl. No. 10/707,619 Non Final Office Action Sep. 21, 2005", 20 pages.

"U.S. Appl. No. 10/707,619 Non Final Office Action Jan. 19, 2007", 4 pages.

"U.S. Appl. No. 10/707,619 Response filed Mar. 28, 2006 to Non Final Office Action Sep. 21, 2005", 16 pages.

"U.S. Appl. No. 10/707,619 Response filed Dec. 8, 2006 to Final Office Action mailed Jun. 8, 2006", 5 pages.

"U.S. Appl. No. 10/707,619 Response filed Mar. 28, 2006 to Non-Final Office Action", 29 pages.

"U.S. Appl. No. 10/707,620 Final Office Action mailed Jun. 5, 2006", 10 pages.

"U.S. Appl. No. 10/707,620 Non Final Office Action mailed Sep. 28, 2005", 10 pages.

"U.S. Appl. No. 10/707,620 Response filed Feb. 28, 2006 to Non Final Office Action mailed Sep. 28, 2005", 10 pages.

"U.S. Appl. No. 10/707,620 Response filed Feb. 28, 2006 to Notice of Non-Compliant Amendment mailed Dec. 28, 2005", 11 pages.

"U.S. Appl. No. 10/707,621 Non Final Office Action mailed Apr. 21, 2005", 10 pages.

"U.S. Appl. No. 10/707,621 Notice of Allowance mailed Jun. 21, 2006", 10 pages.

"U.S. Appl. No. 10/707,621 Response filed Sep. 16, 2005 to Non Final Office Action mailed Apr. 21, 2005", 8 pages.

"U.S. Appl. No. 10/707,621 Response filed Apr. 7, 2006 to Notice of Non-Compliant Amendment", 12 pages.

"U.S. Appl. No. 10/707,621 Non Final Office Action mailed Nov. 8, 2005", 11 pages.

"U.S. Appl. No. 10/707,621 Response filed Mar. 8, 2006 to Non Final Office Action mailed Nov. 8, 2005", 12 pages.

"U.S. Appl. No. 11/470,893 Non Final Office Action mailed May 31, 2007", 13 pages.

"U.S. Appl. No. 11/552,864 Non Final Office Action mailed Jun. 25, 2007", 8 pages.

"U.S. Appl. No. 11/552,864 Notice of Allowance mailed Aug. 17, 2007", NOAR, 9 pages.

"U.S. Appl. No. 11/552,864 Response filed Jul. 27, 2007 to Non Final Office Action mailed Jun. 25, 2007", 8 pages.

"U.S. Appl. No. 11/770,399, Response filed Jul. 14, 2008 to Non-Final Office Action mailed Apr. 14, 2008", 6 pages.

"U.S. Appl. No. 11/770,399 Non-Final Office Action mailed Apr. 14, 2008", OARN, 10 pages.

"International Application No. PCT/US2003/037765 International Search Report dated Mar. 2, 2005", 3 pages.

"International Application Serial No. PCT/US03/37765, International Search Report mailed May 2, 2005", 6 pages.

"U.S. Appl. No. 11/770,399 Notice of Allowance mailed Sep. 9, 2008", 7 pages.

* cited by examiner

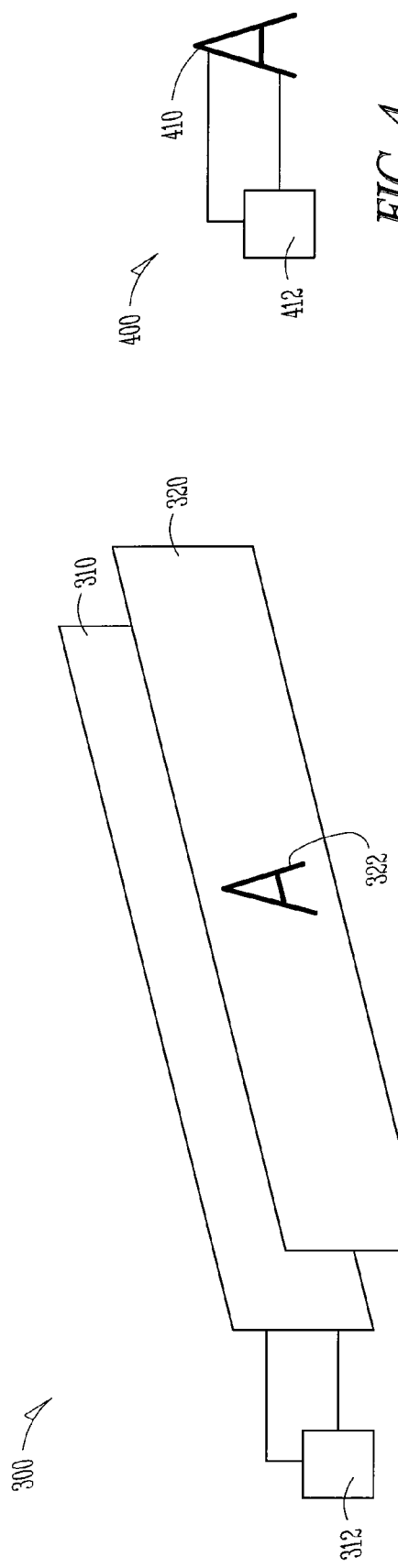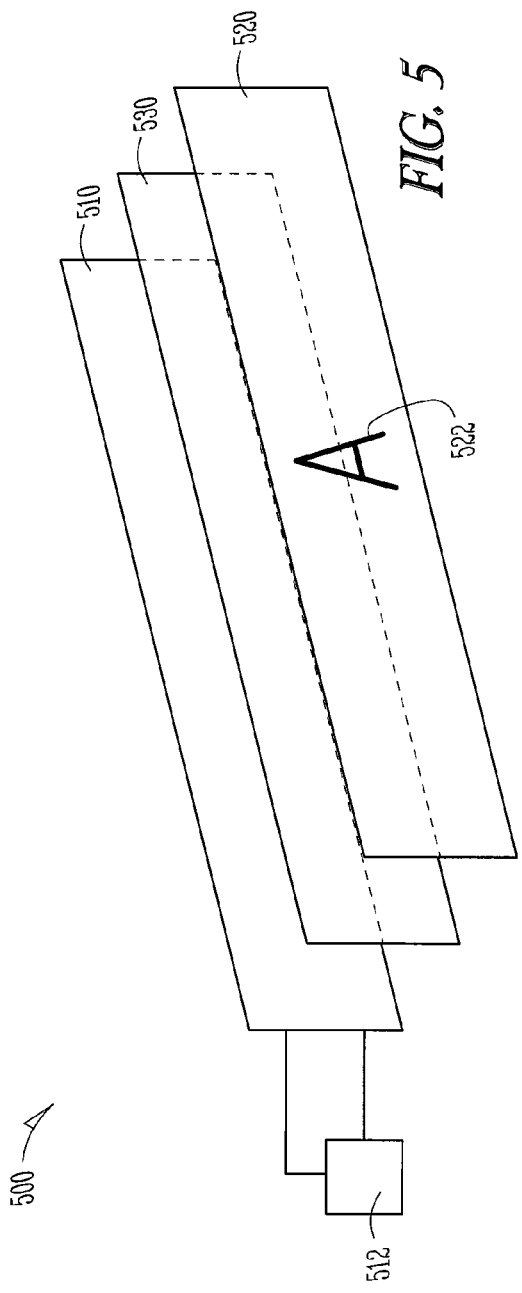

Stay Back Stay Alive Sign

Lamp Baseline Assumptions:

- Lamp Size: 8.5" x 72"
- Construction: Hybrid
- Lit Color: Yellow has a yellow on/off color
- Interconnection: Crimp with Wires
- ITO Substrate Thickness: 0.007" (0.178mm)
- Nominal Lamp Thickness: 0.015" (0.38mm)
- Part Label: On packaging
- Adhesive: None
- Insulator: 0.0015" tape (a thicker laminate may be required for durability)
- Overprint: TBD Power Supply Specs

| Driver | 2-Amp or 5-Amp driver (120Vrm/60Hz input » 140Vrms/600Hz output) |
|---|---|

*FIG. 10*

SAFETY DEVICE FOR TRANSPORTING OVERSIZED LOADS

RELATED APPLICATION (S)

This application is a continuation application of U.S. application Ser. No. 11/552,864, filed Oct. 25, 2006 now U.S. Pat. No. 7,316,491, which is a continuation application of U.S. application Ser. No. 10/707,621, filed Dec. 24, 2003 now U.S. Pat. No. 7,128,449, which is a continuation-in-part of U.S. application Ser. No. 10/645,873, filed Aug. 21, 2003 now U.S. Pat. No. 7,306,345, which claims benefit under 35 U.S.C. §119(e) of U.S. Provisional Application No. 60/429,671 filed Nov. 27, 2002, which applications are incorporated herein by reference.

TECHNICAL FIELD

The invention described herein relates to a method for improving safety for hauling an oversized load.

BACKGROUND ART

This invention relates to a safety device for transporting oversized loads and to a method for transporting oversized loads.

There are many hazardous activities that can be made safer by warning people using safety signs. Specific examples include, but are not limited to, signs on snowplows to warn traffic as they approach from behind, slow moving vehicle signs such as are commonly attached to farm vehicles, oversized load signs on the back of highway transportation vehicles, road construction signs, etc.

Necessarily, for a safety sign to be effective, it must be seen by the person to be warned. In certain road safety situations, as listed above, an approaching vehicle's headlights can illuminate the safety signs. However, headlights are not always adequate to provide the necessary warning. Further, there are other applications of safety signs not involving vehicles with headlights, where the person to be warned requires increased visibility of safety signs in poor visibility conditions, from large distances, at night, etc.

Existing configurations of signs that are self lit, such as by incandescent bulbs, have a number of disadvantages. They require large amounts of power to operate. They produce large amounts of unwanted heat. In an application involving snow, in particular, heat can be detrimental by melting snow to water, which may cause electrical failure and/or icing problems. When existing configurations fail, they fail catastrophically. For example, if a rock from a road hits an incandescent bulb, the bulb breaks and fails completely. Also, when an incandescent bulb burns out, it goes from on to off without any warning or in-between condition.

Existing light configurations also suffer from negative effects of point source lighting. Point sources, such as incandescent bulbs or light emitting diodes (LEDs) provide an intense source of light from a single point. Point sources can cause night blindness after a viewer looks away from the point source light. Also, point source lights appear to flicker and move around when viewed. This is due to their single source beams being distorted by elements such as dust particles, snow flakes, or other elements of the atmosphere between the point source and the viewer. Point source lights also have a limited viewable distance, or penetration through snow, fog, etc. due to similar scattering and distortion of the single source beam.

What is needed is an improved safety sign with high visibility in difficult conditions such as in snow, fog, dust, at night, etc. What is also needed is an improved safety sign without the disadvantages of point source lighting.

DESCRIPTION OF DRAWINGS

FIG. 3 shows an isometric view of a safety sign according to an embodiment of the invention.

FIG. 4 shows a front view of a safety sign according to an embodiment of the invention.

FIG. 5 shows an isometric view of a safety sign according to an embodiment of the invention.

FIG. 10 shows specifications for an embodiment of a safety sign according to an embodiment of the invention.

DISCLOSURE

Figure 1:
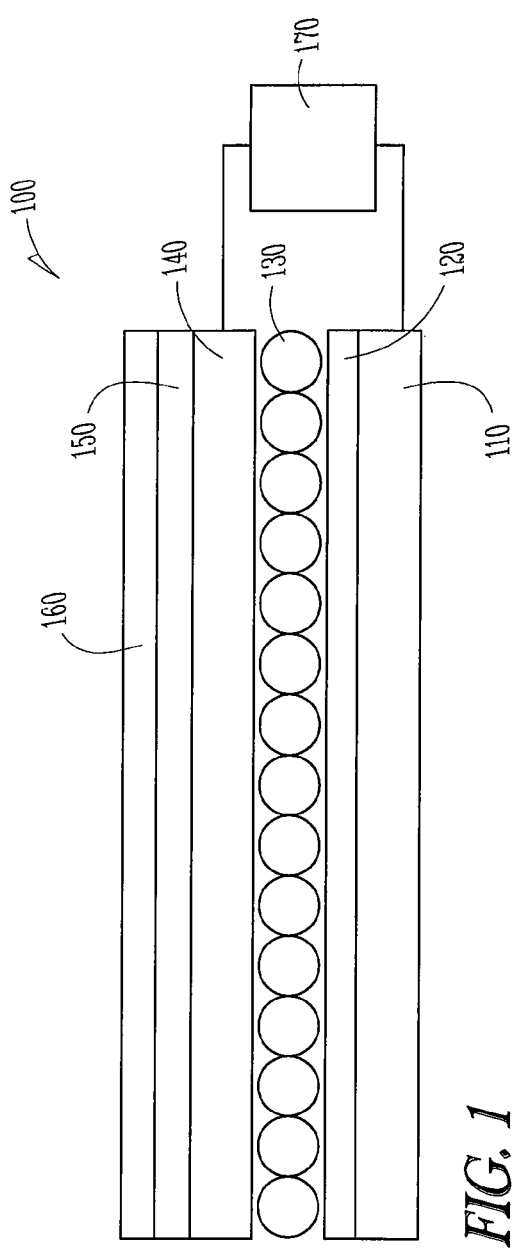
FIG. 1 shows a cross section diagram of a safety sign according to an embodiment of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, electrical changes, etc. may be made without departing from the scope of the present invention.

FIG. 1 shows a safety sign 100 utilizing electroluminescent (EL) technology. A conducting base 110 is shown with a dielectric layer 120 coupled to the conducting base 110. The base is for some embodiments rigid and for other embodiments flexible. This feature enables the sign to be positioned on rigid or flexible surfaces. A number of encapsulated phosphor portions 130 are shown coupled to the dielectric layer 120. In one embodiment, the number of encapsulated phosphor portions 130 are microencapsulated. A second conducting portion 140 is shown coupled over the number of encapsulated phosphor portions 130. In one embodiment, the second conducting portion 140 includes a transparent conductor material. In one embodiment, an encapsulating layer 150 is included over the second conducting portion 140. In one embodiment, the encapsulating layer 150 is included to provide moisture or weather resistance. A pattern layer 160 is further shown coupled over the encapsulating layer 150. In one embodiment, the pattern layer 160 defines a message or symbol that indicates safety or caution.

One of ordinary skill in the art, having the benefit of the present specification will recognize that alternative designs of an EL lighting device are possible. FIG. 1 is intended to illustrate one possible embodiment of an EL lighting configuration in a safety sign. One good example of EL lighting can be obtained from the Durel corporation of Chandler, Ariz.

Figure 2:
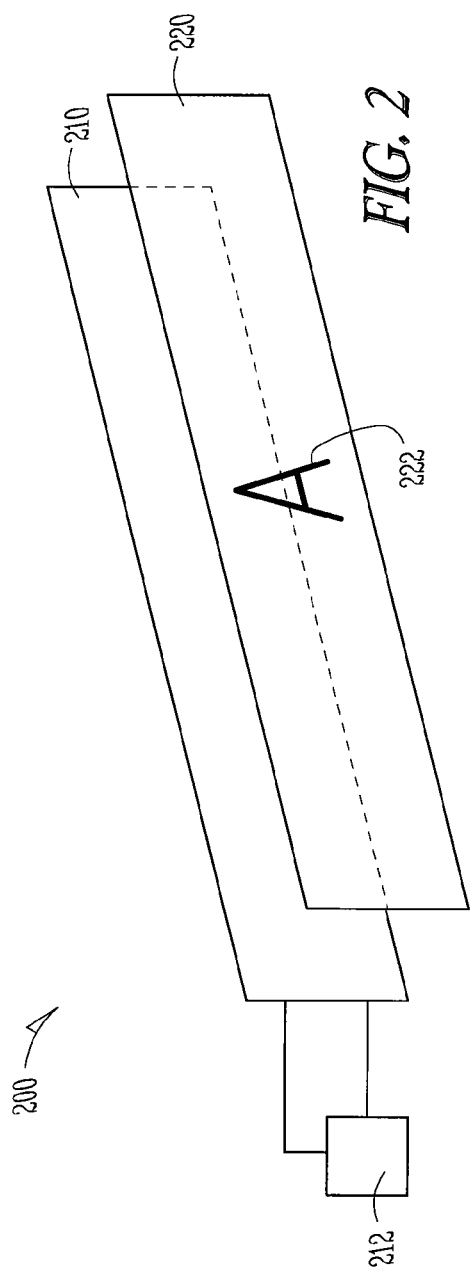
FIG. 2 shows an isometric view of a safety sign according to an embodiment of the invention.
Figure 12:
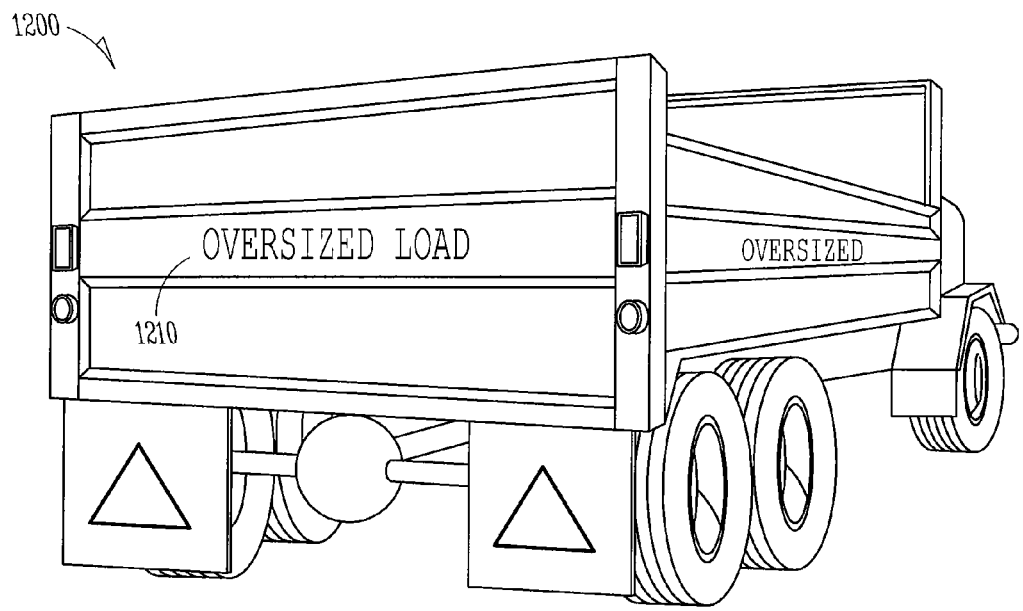
FIG. 12 shows a rear perspective view of a wide truck of the invention that includes the EL safety lighting.
Figure 13:
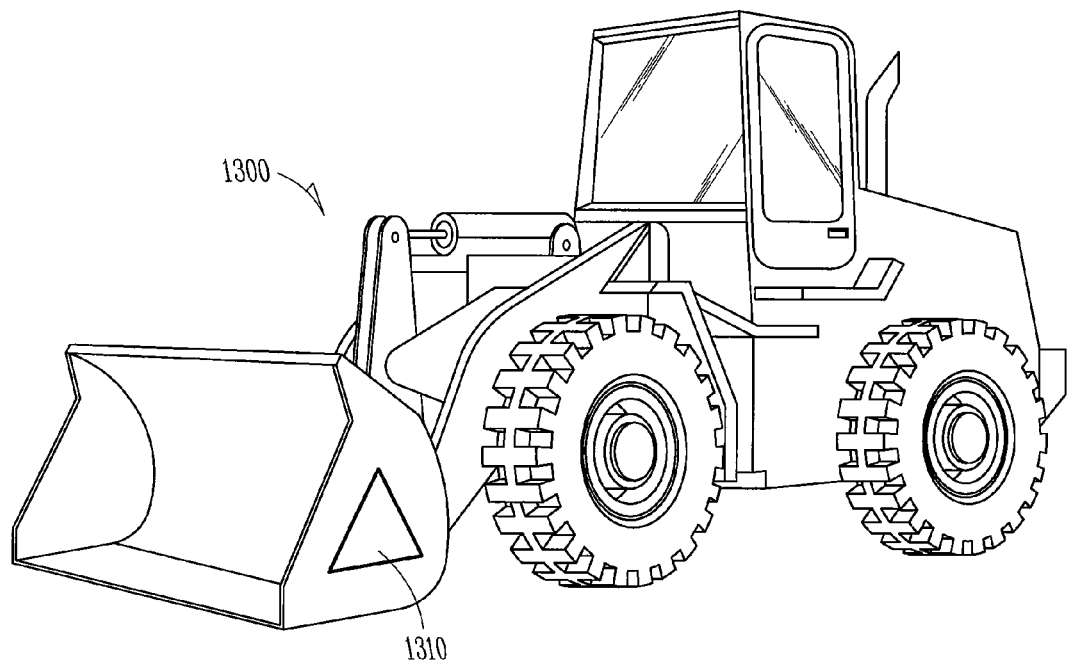
FIG. 13 shows a perspective view of a road construction vehicle of the invention that includes the EL safety lighting.
Figure 14:
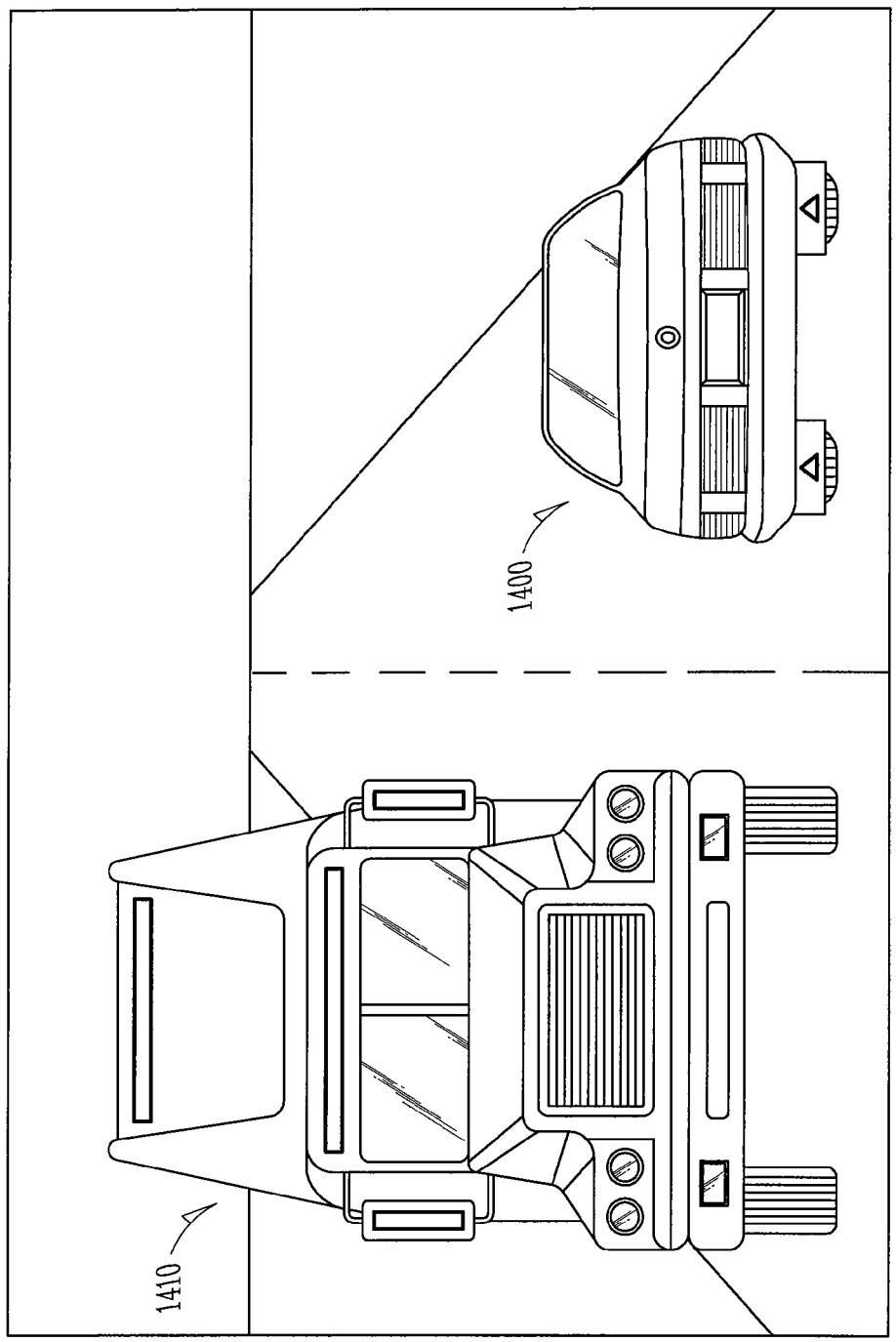
FIG. 14 shows a highway with two adjacent motor vehicles, each containing EL lighting of the invention.
Figure 17:
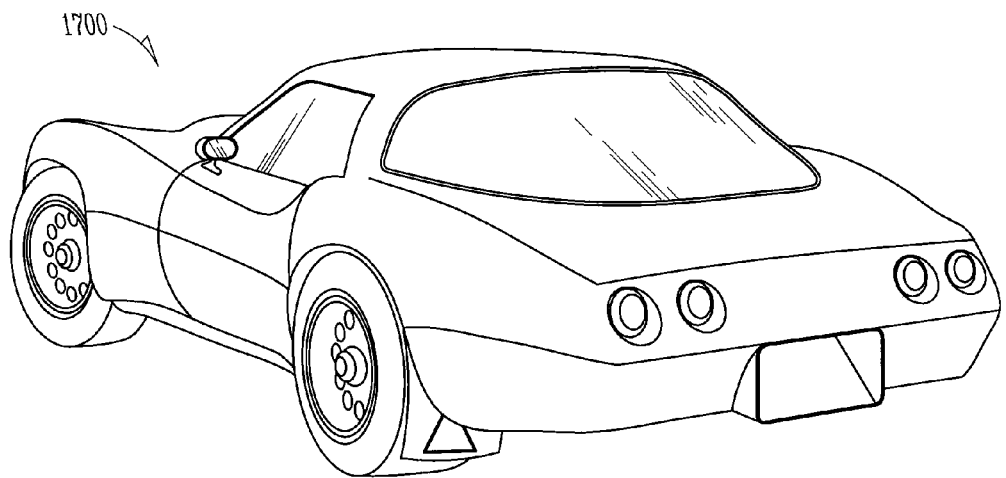
FIG. 17 shows a rear perspective view of one motor vehicle embodiment of the invention that includes EL safety lighting.
Figure 18:
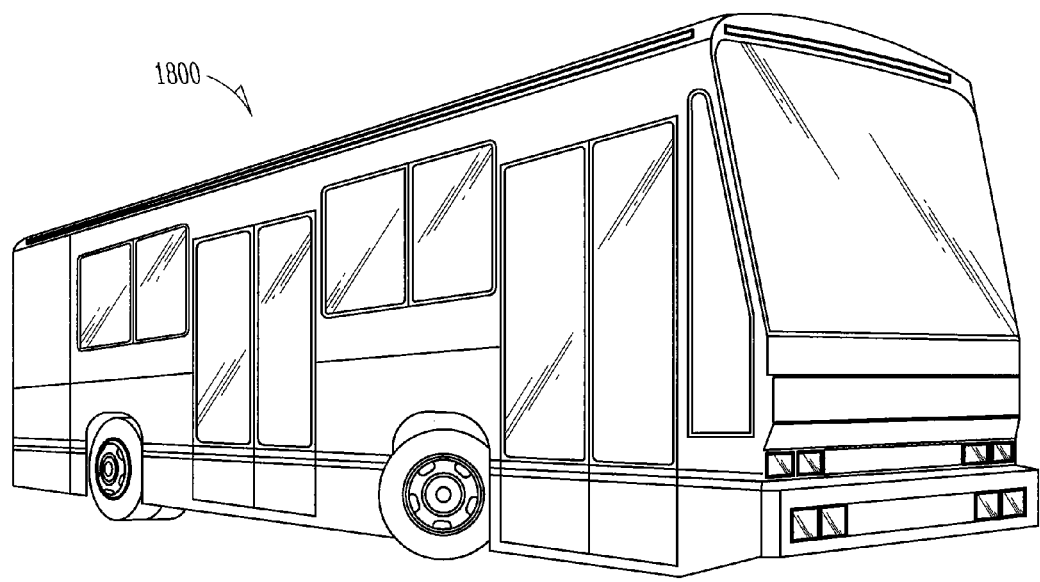
FIG. 18 shows a perspective view of another motor vehicle embodiment of the invention that includes EL safety lighting.
Figure 19:
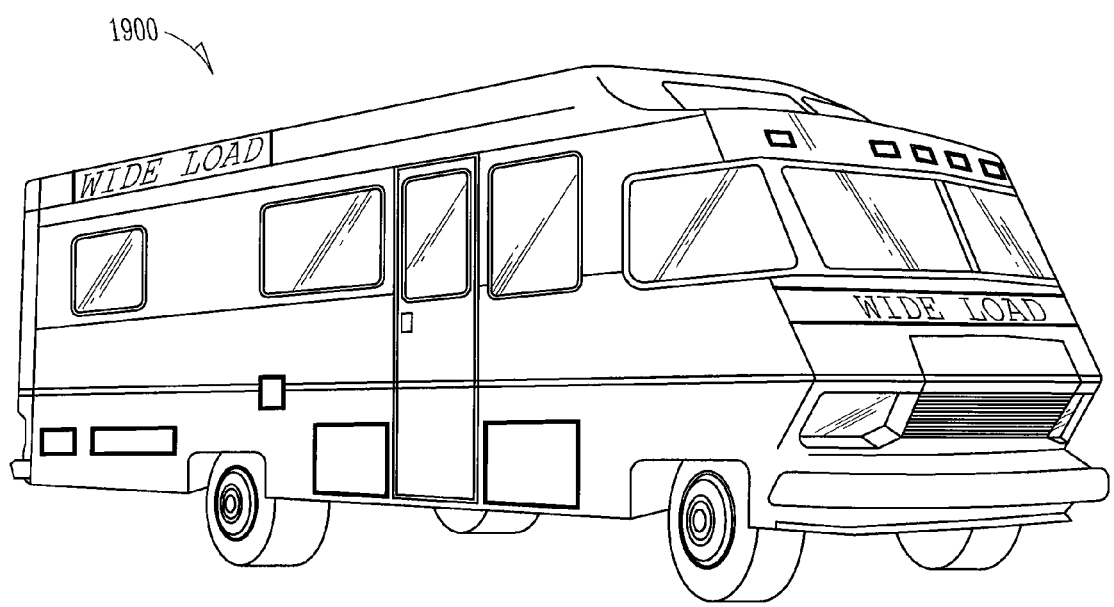
FIG. 19 shows a perspective view of another motor vehicle embodiment of the invention that includes safety lighting.

FIG. 2 shows an embodiment of a safety sign 200. The safety sign 200 includes an EL lighting surface 210, and a power source 212 coupled to the EL lighting surface 210. In one embodiment, the power source 212 includes an AC power source. In one embodiment, the power source 212 includes a DC power source coupled to an AC converter. In one embodiment, the power source is supplied by a power hook up on a vehicle. A layer 220 is also included, with a pattern 222 located on the layer 220. In FIG. 2, the layer 220 includes a transparent layer. The pattern 222 in FIG. 2 is substantially opaque. Embodiments of patterns 222 include, but are not limited to, text, numbers, symbols, shapes, etc. The safety sign 200 operates by transmitting light from the EL lighting surface 210 through portions of the layer 220 that are not obscured by the pattern 222. As used herein, the term "vehicle" refers to two-wheeled, three-wheeled and four-wheeled automobiles, as shown at 1400 in FIG. 14, 1700 in FIG. 17, trucks as shown at 1200 in FIG. 12, 1410 in FIG. 14, semi's, as shown at 1500 in FIG. 15, fire engines, trains, rail cars, snowplows as shown at 1102 in FIG. 11, bicycles, police cars, buses as shown at 1800 in FIG. 18, ambulances, RV's as shown at 1900 in FIG. 19, road construction vehicles as shown at 1300 in FIG. 13 and any other vehicle having safety needs.

FIG. 3 shows an embodiment of a safety sign 300. The safety sign 300 includes an EL lighting surface 310, and a power source 312 coupled to the EL lighting surface 310. Power source 312 includes, but is not limited to embodiments of power sources described above. A layer 320 is also included, with a pattern 322 located on the layer 320. In FIG. 3, the layer 320 includes a substantially opaque layer. The pattern 322 in FIG. 3 is substantially transparent. In one embodiment, the pattern 322 is cut out from the layer 320. Pattern 322 includes, but is not limited to embodiments of patterns described above. The safety sign 300 operates by transmitting light from the EL lighting surface 310 through the substantially transparent pattern 322.

FIG. 4 shows an embodiment of a safety sign 400. The safety sign 400 includes an EL lighting surface 410, and a power source 412 coupled to the EL lighting surface 410. Power source 412 includes, but is not limited to embodiments of power sources described above. In one embodiment, the EL lighting surface 410 is shaped into a pattern. The pattern includes, but is not limited to embodiments of patterns described above. The safety sign 400 operates by transmitting light from the EL lighting surface 410 directly in a pattern that conveys a message of safety. A text pattern may, for example, convey a warning, such as is shown at 1510 in FIG. 15. A triangle or other geometric shape may indicate a slow moving vehicle, as is shown at 1110 in FIG. 11.

FIG. 5 shows an embodiment of a safety sign 500. The safety sign 500 includes an EL lighting surface 510, and a power source 512 coupled to the EL lighting surface 510. Power source 512 includes, but is not limited to embodiments of power sources described above. A layer 520 is also included, with a pattern 522 located on the layer 520. In FIG. 5, the layer 520 includes a transparent layer. The pattern 222 in FIG. 2 is substantially opaque. Alternatively, the layer 520 in FIG. 5 may include a substantially opaque layer with a pattern 522 that is substantially transparent. A layer 530 is further included in the safety sign 500. The layer 530 includes properties that alter a color of the EL lighting surface 510.

Selected embodiments of safety signs as described in this document include colored EL material. Both an illuminated color and a non-illuminated color may be selected. Possible colors include yellow, white, blue-green, etc. A color can be chosen in the non-illuminated condition that is suited for daytime, while a different color can be chosen for the illuminated condition to optimize both day and night. The addition in safety sign 500 of a layer 530 further broadens color options. In one embodiment, the layer 530 is tinted to alter the color of the EL lighting surface. In one embodiment, an EL lighting surface is included that is white in a non-illuminated condition, and blue-green in an illuminated condition. In one embodiment, a yellow tinted layer 530 is further included. This provides a yellow appearance in the day, with a light green appearance at night. In one embodiment, the light green complies with government regulations for color. In another embodiment, an EL lighting surface is included that is yellow in a non-illuminated condition, and yellow in an illuminated condition. In one embodiment, a yellow tinted layer 530 is further included. This provides a yellow appearance in the day, and a yellow appearance at night.

In one embodiment, the pattern 522 is cut out from the layer 520. Pattern 522 includes, but is not limited to embodiments of patterns described above. The safety sign 500 operates by transmitting light from the EL lighting surface 510 through the layer 530 and through substantially transparent portions of the layer 520.

Figure 6:
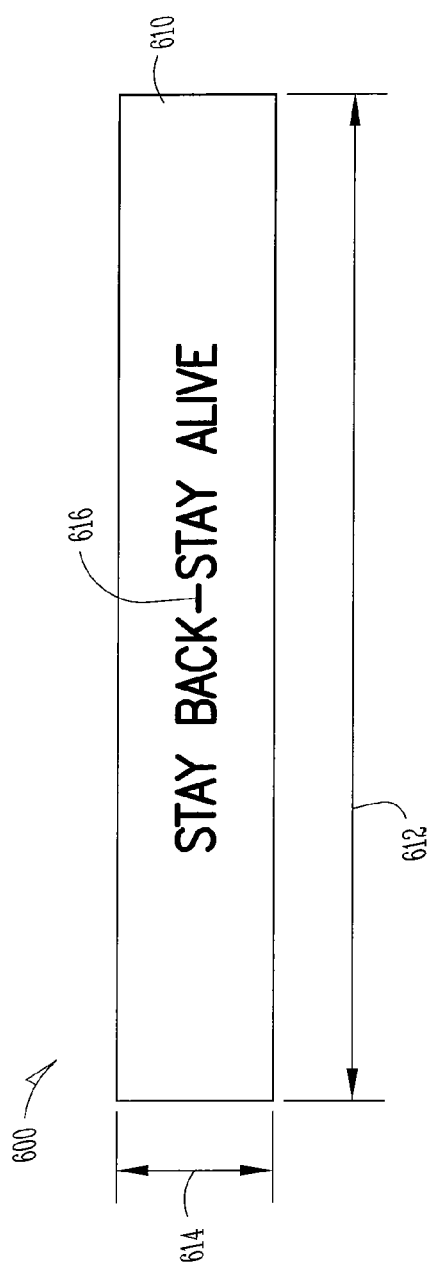
FIG. 6 shows a front view of a safety sign according to an embodiment of the invention.

FIG. 6 shows one embodiment of a safety sign 600. The safety sign 600 includes an EL lighting surface 610. In one embodiment the shape of the safety sign 600 is dictated by a government standard. In FIG. 6, the EL lighting surface 610 of the safety sign 600 is substantially rectangular in shape. In FIG. 6, a width 612 of the EL lighting surface 610 is approximately 72 inches. In FIG. 6, a height 614 of the EL lighting surface 610 is approximately 8.5 inches. A pattern 616 is included on the safety sign 600 similar to embodiments described above. In one embodiment the pattern includes a text message that states "Stay Back—Stay Alive." In one embodiment the pattern includes a text message that states "Oversized Load," as shown at 1210 in FIG. 12. Any number of safety messages are possible within the scope of the invention. In addition to text, as described above, shapes or symbols are also possible to convey a message of safety. For example, a triangle may be used to indicate a slow moving vehicle, as shown at 1310 in FIG. 13.

Figure 7:
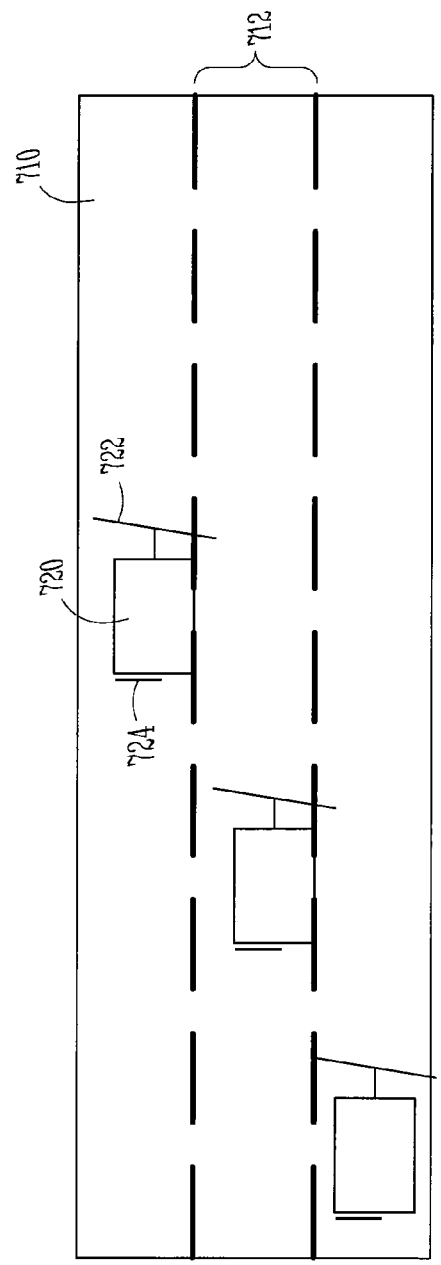
FIG. 7 shows a diagram of one embodiment of a method for plowing a road.

FIG. 7 shows an embodiment of a method utilizing safety signs as described in embodiments above. A road 710 is shown with a number of lanes 712. A number of vehicles 720 are shown on the road in a formation. In one embodiment, the vehicles 720 include snowplows. Other embodiments of vehicles include, but are not limited to, road graders, dump trucks, various construction equipment, road transportation vehicles, flat bed trucks, and so forth. The vehicles 720 as shown in FIG. 7 are snowplows, each vehicle 720 including a plow 722. In one embodiment, a safety sign 724 as described in embodiments above is affixed to at least one vehicle 720. In one embodiment, the vehicles 720 guide off each other in alignment using the safety signs 724. In one embodiment, the safety signs 724 are affixed to the rear of the vehicles 720. In one embodiment, the safety signs 724 are affixed to the front of the vehicles 720. One of ordinary skill in the art, having the benefit of the present specification will appreciate that several possible formations of vehicles are possible within the scope of the invention.

Figure 8:
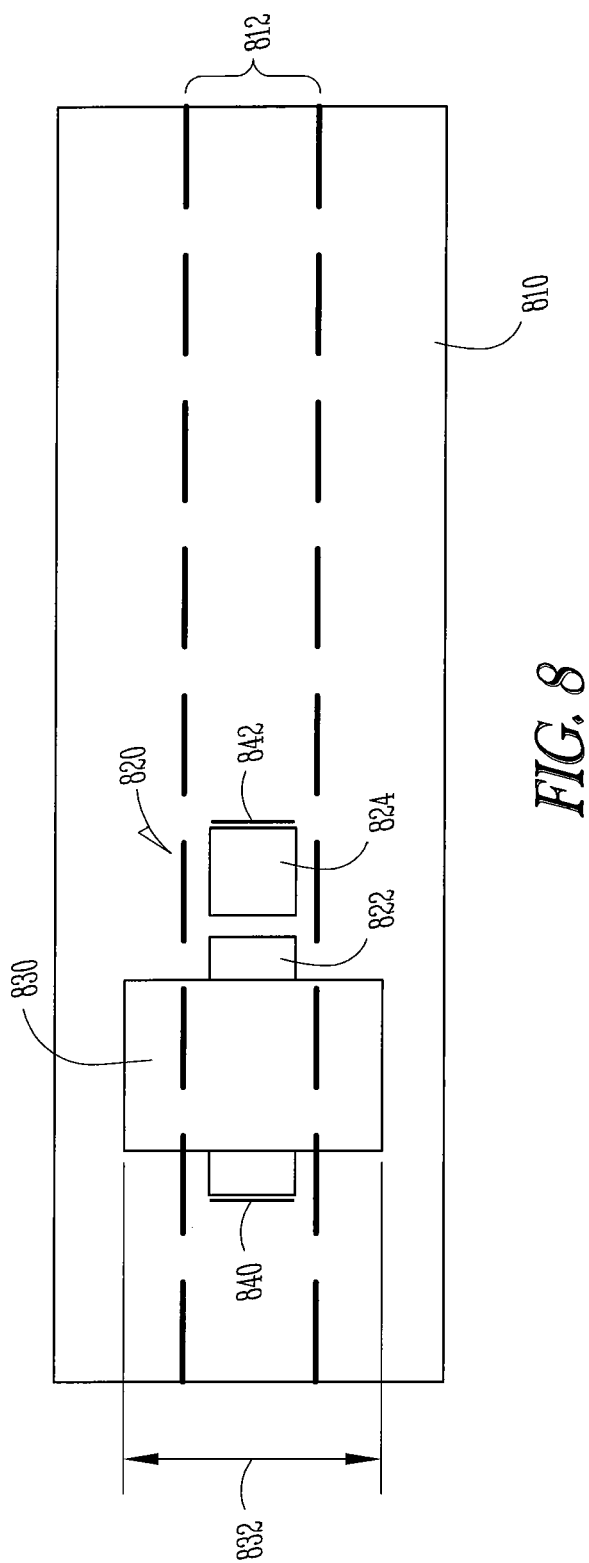
FIG. 8 shows a diagram of one embodiment of a method for transporting an oversized load.

FIG. 8 shows an embodiment of a method utilizing safety signs as described in embodiments above. A road 810 is shown with a number of lanes 812. A transportation vehicle 820 such as a flat bed truck is shown with a payload portion 822 and a cab portion 824. A load 830 is shown as an oversized load with a width 832 that affects more than one lane 812. A safety sign 840 according to embodiments described above is shown attached to a rear portion of the transportation vehicle 820. In one embodiment, an additional safety sign 842 according to embodiments described above is shown attached to a front portion of the transportation vehicle 820.

For some embodiments, vehicles include more than one safety sign using EL lighting. The signs are positionable on the front and rear and side portions of a vehicle, as shown in one example, at 1500 in FIG. 15. The vehicle 1500 includes a cab 1512 and a trailer 1519 capable of carrying hazardous cargo. The cab includes EL warning signals 1516. The power source is not shown, but as described above is a component of the EL lighting. The trailer 1519 includes the "DANGER" sign 1510, and a "LONG LOAD" sign 1517. The trailer 1519 also includes EL strips 1520 and 1522. The vehicle 1500 also includes mudflaps 1524 and each include an EL lighting safety sign 1526. The EL lighting for motor vehicle 1500 is for some embodiments, multicolored. For other embodiments the lighting is static and blinking or all static or all blinking. While these lighting features are described for motor vehicle 1500, it is understood that the features are usable for all motor vehicle embodiments.

Figure 15:
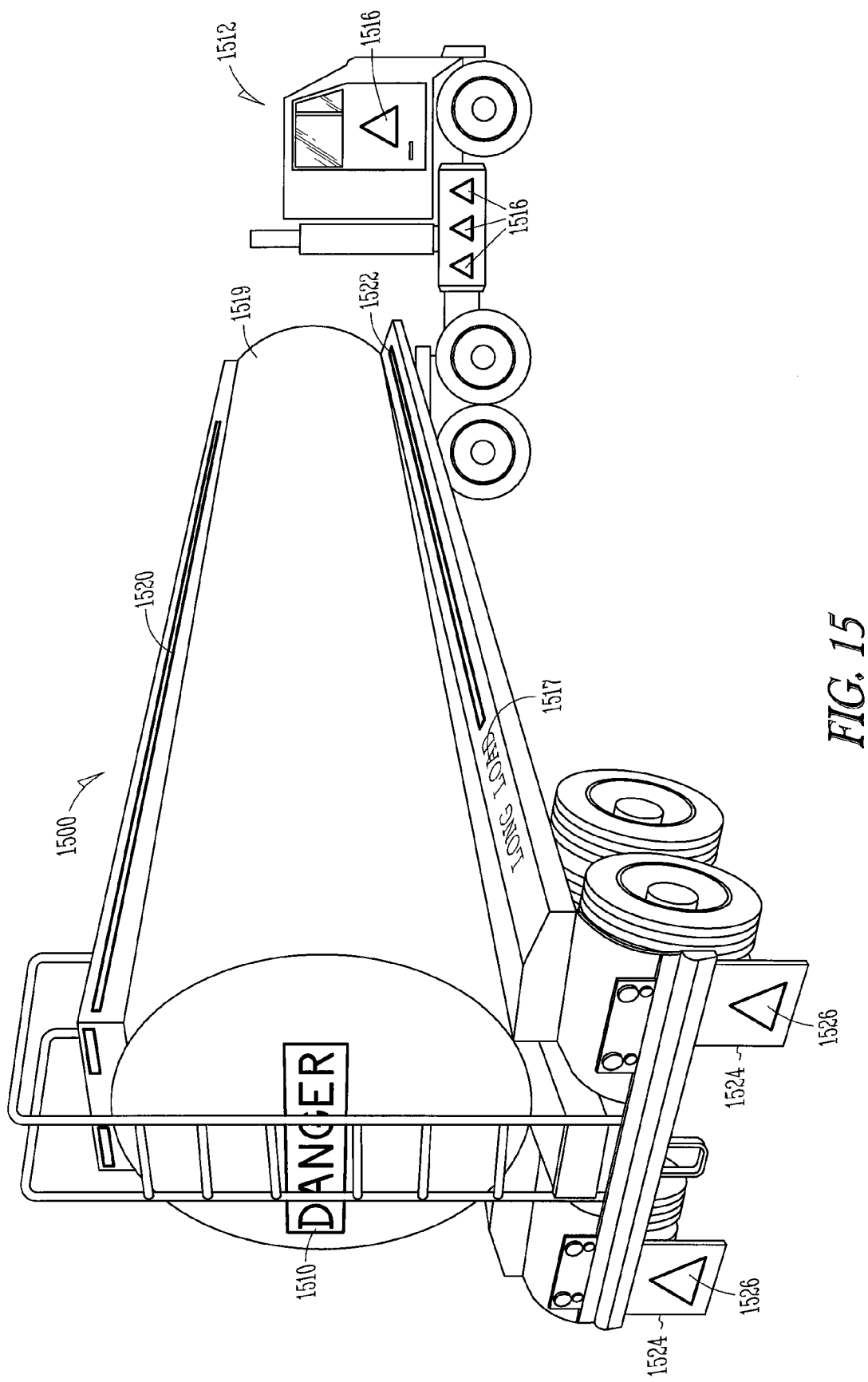
FIG. 15 shows a rear perspective view of a motor vehicle of the invention with a long trailer that includes the EL lighting.
Figure 16A:
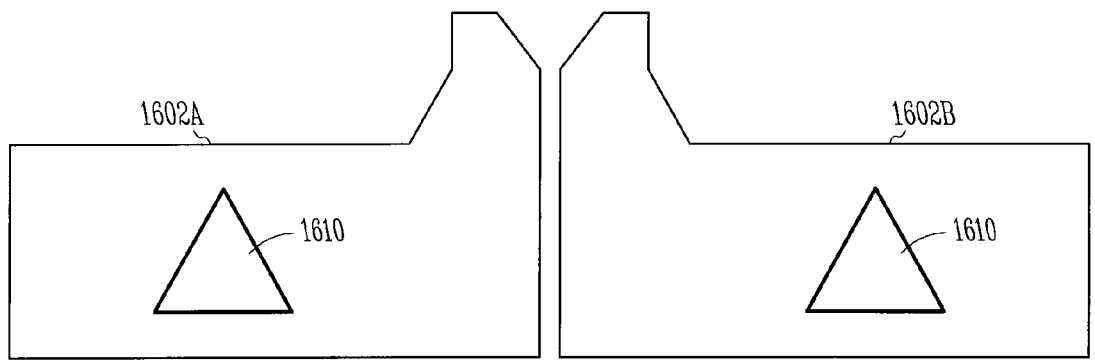
FIG. 16A shows a top plan view of one mudflap embodiment of the invention that includes EL lighting.
Figure 16B:
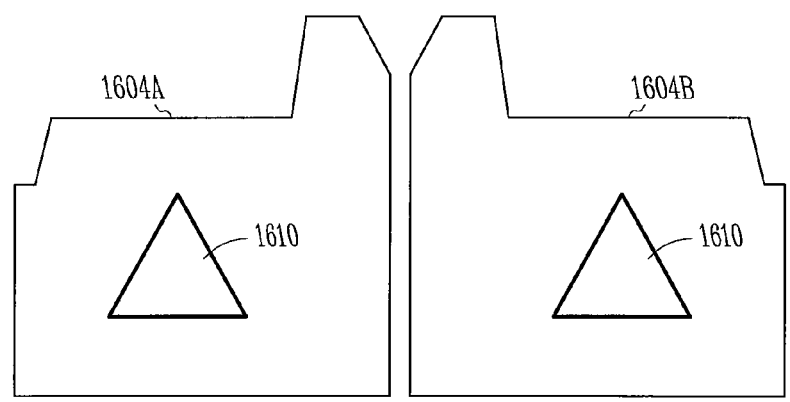
FIG. 16B shows a top plan view of another mudflap embodiment of the invention that includes EL lighting.

In one embodiment, safety signs and other indicia illuminated by EL lighting are positionable on mudflaps, such as is shown at 1524 and 1526 in FIG. 15. Mudflaps, as used herein, are a component of a vehicle. Two types of mudflap embodiments are shown at 1602A and 1602B and 1604A and 1604B in FIGS. 16A and 16B. The mudflaps 1602A and 1602B are for left and right handed sides of a vehicle. Each of the pair of mudflaps 1602A and 1602B and 1604A and 1604B includes an EL safety sign 1610. The power source of the sign 1610 is attached to the sign as described above.

Figure 9:
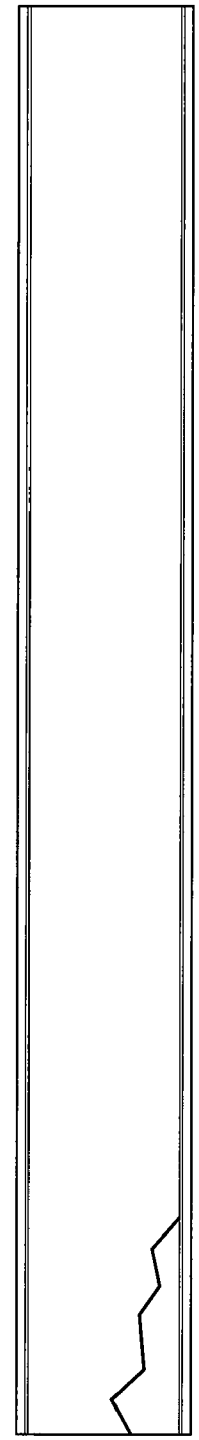
FIG. 9 shows a print for an embodiment of a safety sign according to an embodiment of the invention.

FIG. 9 shows a print of a safety sign according to one embodiment of the invention. FIG. 10 shows operational specifications according to one embodiment of the invention.

Figure 11:
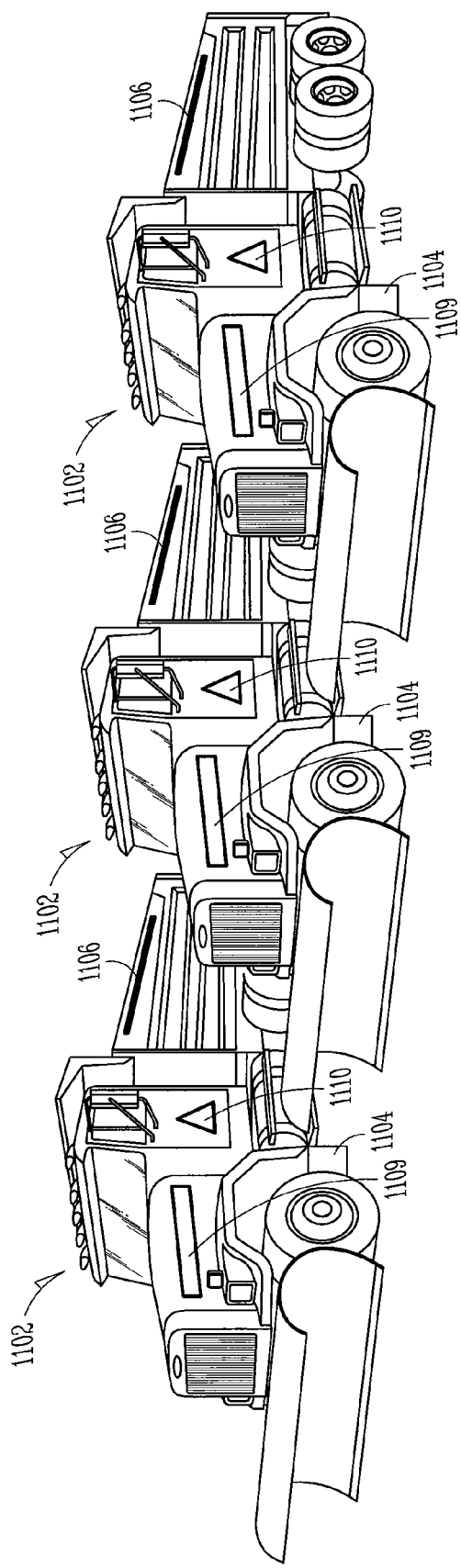
FIG. 11 shows a perspective view of snowplows of the invention that include the EL safety lighting.

A method of improving safety of snowplows and motor vehicles in hazardous visibility conditions, such as a snowstorm is shown in FIG. 11. The snowplows 1102 include EL lighting 1109 and 1110 on the cabs, on the mudflaps 1104 and 1106 on the trailer. The snowplows also include EL lighting on the rear of the trailer and, optionally, on mudflaps in the rear of the trailer, which are not shown.

In one other embodiment, EL safety signs are used to mark and illuminate structures such as bridges, and on and off ramps. The signs are positioned on structures such as guard rails, and, for some embodiments, the road itself.

Safety signs as described above all utilize EL technology. EL technology provides a number of advantages to safety signs as described above. The safety signs described using EL technology use lower power than conventional lighting technology. The safety signs described using EL technology produce very low heat compared to conventional lighting technology. This can be especially advantageous in snow applications as discussed above in the background. The safety signs described using EL technology are more robust than conventional lighting technology, and not prone to catastrophic failure. Due to numerous encapsulated phosphor portions, it is difficult to damage all encapsulated phosphor portions during an event such as a rock hitting a sign. Further, EL lighting does not burn out catastrophically as incandescent light bulbs do.

Further, because EL lighting generates light from encapsulated portions along a large area (such as 72 inches by 8.5 inches) the light provided by the EL lighting is not a point source, but is an area source. This reduces or eliminates night blinding, and flicker produced by point sources such as incandescent lights, and LEDs. Further, the area source of EL lighting can be seen from farther away, and through difficult conditions such as snow, dust, fog, etc. This is due to EL lighting providing numerous sources (an area of sources) of light to compensate for scattering and disbursement of light from any one individual source in the EL surface.

For the reasons above, safety signs as described above are more visible in poor conditions such as snow, dust, fog, low light, etc. Safety signs as described above can be seen from farther away than conventional signs. Safety signs as described above eliminate problems associated with point source lighting.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A method, comprising:

assembling a cab to a trailer;

affixing at least one electroluminescent ("EL") lighting device, for illuminating a sign to at least one of the cab and the trailer such that the at least one EL lighting device is oriented to a rear of the trailer;

affixing at least one additional EL lighting device for illuminating a further sign to at least one of the cab and the trailer such that the at least one additional EL lighting device is oriented to a front of the cab, the at least one EL lighting device and at least one additional EL lighting device formed by encapsulating a phosphor portion of the EL lighting device with an encapsulation layer to resist moisture;

powering the at least one EL lighting device to illuminate an area in front of the cab;

powering the at least one additional EL lighting device to illuminate an area behind the trailer; plowing snow with the cab and trailer; and following the cab and trailer with a further truck in a predetermined truck formation, with the sign oriented toward the further truck while the further truck is in the predetermined truck formation with the cab and trailer.

2. The method of claim 1 wherein the EL lighting device includes at least two colors.

3. The method of claim 1 wherein the at least one additional EL lighting device is attached to at least one mudflap coupled to the trailer.

4. The method of claim 1, wherein the at least one EL lighting device includes a triangle.

5. The method of claim 1, further comprising plowing snow with the further truck, the further truck including a further safety indicia illuminated by further EL, the further EL oriented toward the front of the further truck to illuminate a space in front of the front of the further truck.

6. A method for improving driver safety in a vehicle that includes a cab and a trailer, comprising:
   assembling the cab to the trailer; loading the cab and the trailer with an oversized load;
   coupling a front safety indicia to a front electroluminescent ("EL") lighting surface for illuminating the front safety indicia, the EL lighting surface formed by encapsulating a phosphor portion of the front EL lighting surface with an encapsulation layer to resist moisture;
   coupling a rear safety indicia to a rear EL lighting surface for illuminating the rear safety indicia, the rear safety indicia including a slow moving vehicle sign, the rear EL lighting surface formed by encapsulating a phosphor portion of the rear EL lighting surface to resist moisture;
   affixing the front EL lighting surface to the cab so that it is oriented toward the front of the cab;
   affixing the rear EL lighting surface to the trailer so that it is oriented toward the rear of the trailer; and
   powering the front EL lighting surface to illuminate an area in front of the cab;
   powering the rear EL lighting surface to illuminate an area behind the trailer; and
   hauling the oversized load with the cab and trailer while both the first EL lighting surface and the rear EL lighting surfaces are illuminated; and following the cab and trailer with a further truck in a predetermined truck information, with the slow moving vehicle sign oriented toward the further truck while the further truck is in the predetermined truck formation with the cab and trailer.

7. The method of claim 6 wherein the safety indicia illuminated by the rear EL lighting surface includes a surface on a mudflap attached to the trailer.

8. The method of claim 6 wherein the safety indicia illuminated by at least one EL lighting surface includes a surface on the cab.

9. The method of claim 6 wherein the front safety indicia includes an oversized load sign.

10. The method of claim 6 wherein the safety indicia illuminated by the front EL lighting surface includes a surface on at least one rear view mirror of the cab.

11. The method of claim 6 wherein the front safety indicia includes an approximately triangular shape.

12. The method of claim 6, further comprising hauling a further oversized load the further truck, the further truck having a further safety indicia illuminated by further EL, the further EL oriented toward the front of the further truck to illuminate a space in front of the front of the further truck.

13. A method for improving driver safety, comprising:
   assembling a cab to a trailer;
   coupling a front safety pattern to a front electroluminescent ("EL") lighting surface for illuminating the front safety indicia, the front EL lighting surface formed by encapsulating a phosphor portion of the front EL lighting surface with an encapsulation layer to resist moisture;
   coupling a rear safety pattern to a rear EL lighting surface for illuminating the rear safety indicia, the rear safety indicia including a slow moving vehicle sign, the rear EL lighting surface formed by encapsulating a phosphor portion of the rear EL lighting surface to resist moisture;
   affixing the front EL lighting surface to the cab so that it is oriented toward the front of the cab;
   affixing the rear EL lighting surface to the trailer so that it is oriented toward the rear of the trailer;
   powering the front EL lighting surface to illuminate an area in front of the cab; and
   powering the rear EL lighting surface to illuminate an area behind the trailer;
   plowing snow with the cab while both the first EL lighting surface and the rear EL lighting surfaces are illuminated;
   following the cab and trailer with a further truck in a predetermined truck formation, with the slow moving vehicle sign oriented toward the further truck while the further truck is in the predetermined truck formation with the cab and trailer; and
   plowing snow with the further truck, the further truck having a further safety indicia illuminated by further EL, the further EL oriented toward the front of the further truck to illuminate a space in front of the front of the further truck.

14. The method of claim 13 wherein the safety pattern illuminated by the rear EL lighting surface includes a surface on a mudflap attached to the trailer.

15. The method of claim 13 wherein the front safety pattern includes an approximately triangular shape.

16. The method of claim 13 wherein the front EL lighting surface is approximately triangular.

17. The method of claim 13 wherein the rear safety pattern includes an approximately triangular shape.

18. The method of claim 13 wherein the rear EL lighting surface is approximately triangular.

* * * * *

UNITED STATES PATENT AND TRADEMARK OFFICE
CERTIFICATE OF CORRECTION

| | | |
|---|---|---|
| PATENT NO. | : 7,665,870 B2 | Page 1 of 1 |
| APPLICATION NO. | : 11/970426 | |
| DATED | : February 23, 2010 | |
| INVENTOR(S) | : Aaron J. Golle et al. | |

It is certified that error appears in the above-identified patent and that said Letters Patent is hereby corrected as shown below:

In column 7, line 12, in Claim 5, before "further" delete "front of the".

In column 7, line 39, in Claim 6, delete "information," and insert -- formation, --, therefor.

In column 8, line 4, in Claim 12, before "the" insert -- with --.

In column 8, line 7, in Claim 12, before "further" delete "front of the".

In column 8, line 38, in Claim 13, before "further" delete "front of the".

Signed and Sealed this

Eighteenth Day of May, 2010

David J. Kappos
*Director of the United States Patent and Trademark Office*